Dec. 14, 1943.  I. F. SCHRECK  2,336,642
TRACTOR UNIT FOR INDUSTRIAL TRUCKS
Filed Oct. 7, 1941  2 Sheets-Sheet 1
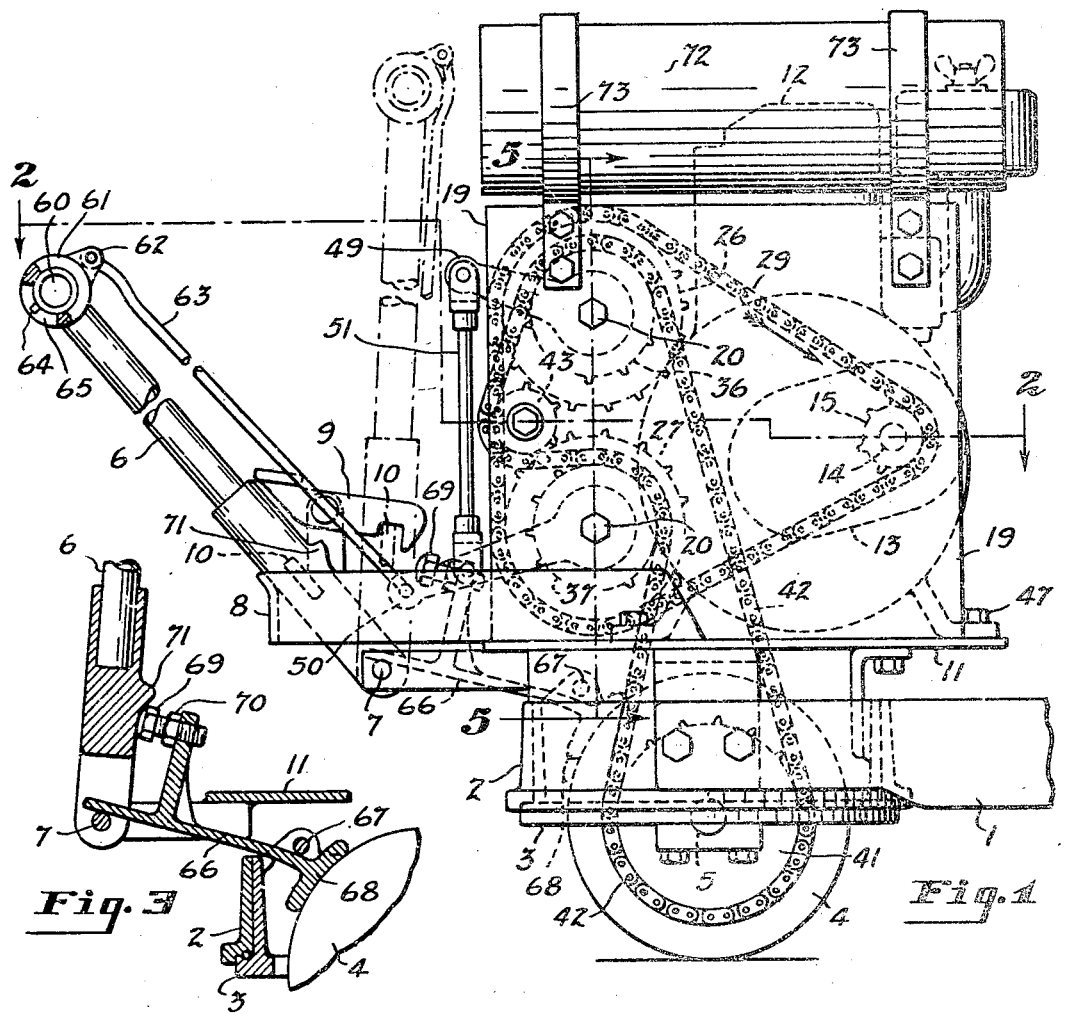
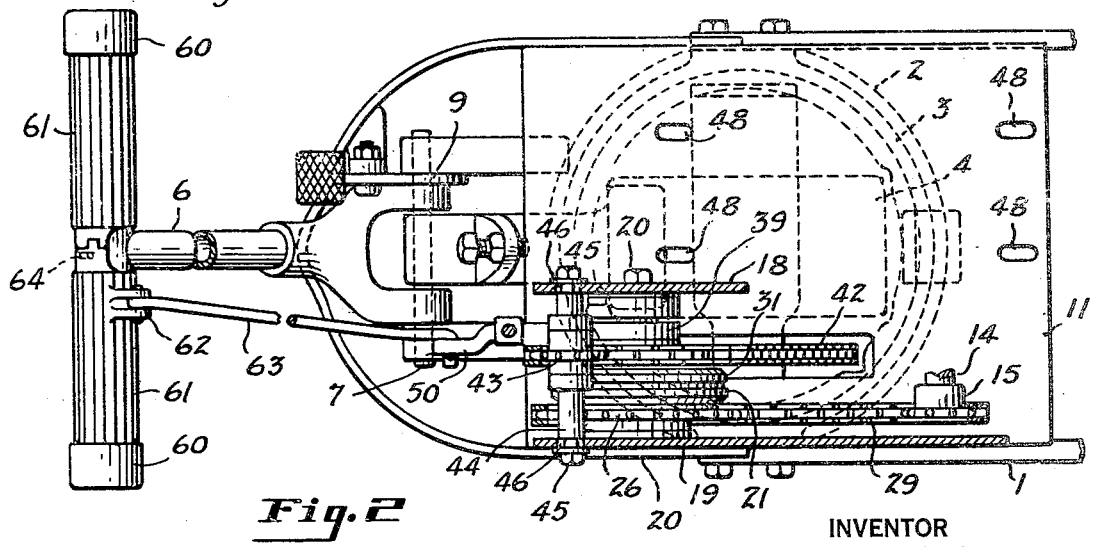
INVENTOR
Irvin F. Schreck
BY Frank S. Greene
ATTORNEY Dec. 14, 1943. I. F. SCHRECK 2,336,642
TRACTOR UNIT FOR INDUSTRIAL TRUCKS
Filed Oct. 7, 1941 2 Sheets-Sheet 2
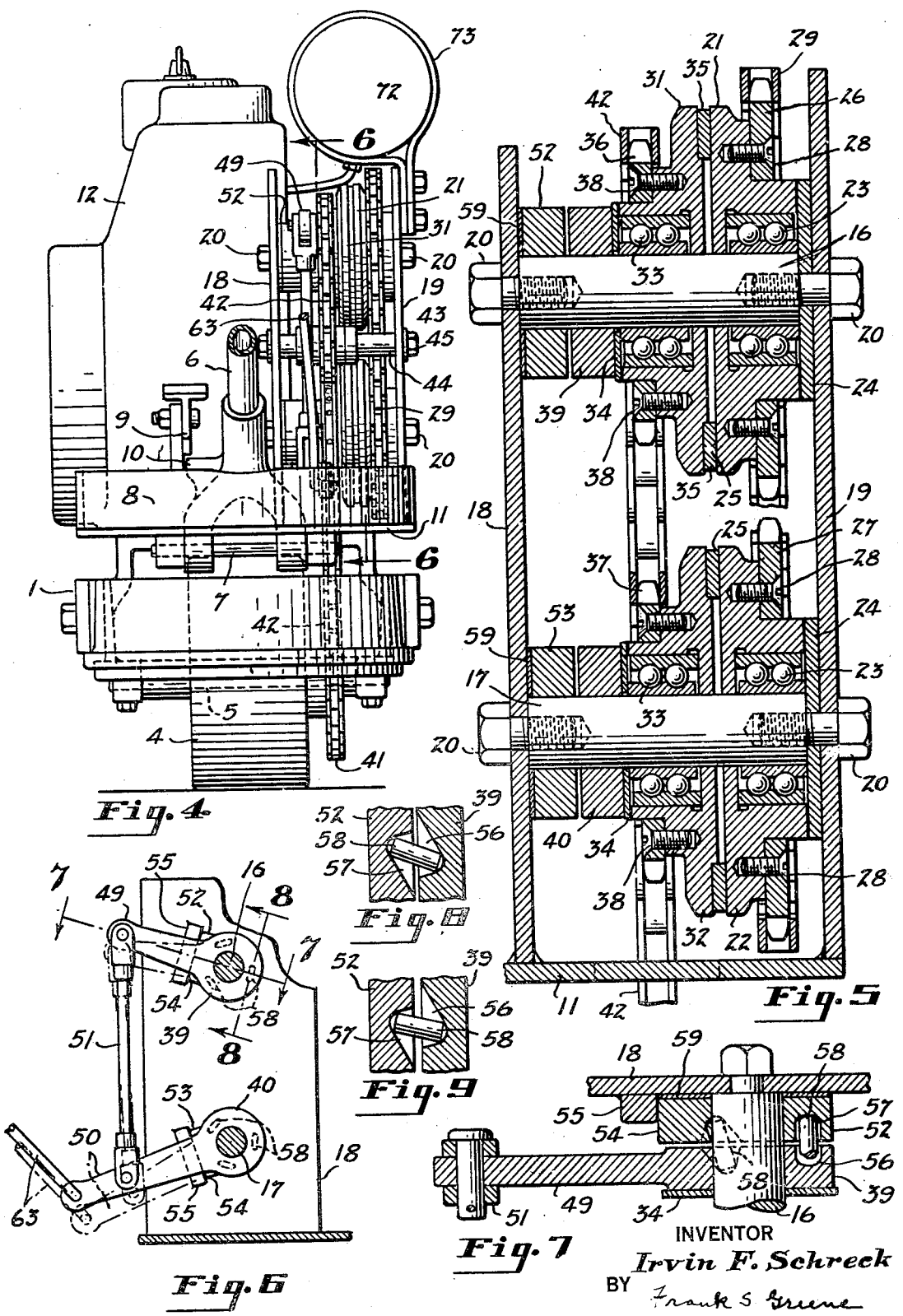
INVENTOR
Irvin F. Schreck
BY Frank S. Greene
ATTORNEY Patented Dec. 14, 1943

2,336,642

UNITED STATES PATENT OFFICE 2,336,642

TRACTOR UNIT FOR INDUSTRIAL TRUCKS

Irvin F. Schreck, Cleveland Heights, Ohio

Application October 7, 1941, Serial No. 413,960

15 Claims. (Cl. 180—13)

This invention relates to tractor units for industrial trucks and, more particularly, to the propelling mechanism and the controlling means therefor.

The invention has for an object to provide a tractor unit in which the traction wheel driving mechanism consists of a driving motor and a clutch controlled, reversible driving mechanism interposed between the motor and wheel, and in which the motor and mechanism are compactly mounted upon a relatively small supporting platform on the frame of the unit adjacent the traction wheel with the reversible driving mechanism occupying a narrow space alongside the motor.

The invention has for a further object to provide an inexpensive and compact clutch controlled, reversible driving mechanism for a tractor unit which is adapted to be controlled by a simple, manually operable clutch actuator.

A further object is to provide the tractor unit with a draft tongue by means of which the truck may be drawn manually, the tongue having clutch controlling means mounted thereon, by which the operation of the driving mechanism may be controlled by the operator.

A further object is to control the reversing mechanism by swinging movements of the draft tongue in such manner that the truck cannot be propelled toward the operator when the draft tongue is moved to its uppermost position, but which will permit the truck to be propelled in a rearward direction with the draft tongue in its uppermost position.

Further objects are to provide a clutch controlled reversing drive for the traction wheel through friction clutch elements which have only a slight axial movement between their engaged and disengaged positions and which free themselves as soon as axial pressure is released, and to provide simple and conveniently operable means for controlling such clutches.

A further object is to provide a simple chain and sprocket drive for the traction wheel, which includes a clutch operated reversing means.

With the above and other objects in view, the invention may be said to comprise the traction unit as illustrated in the accompanying drawings, hereinafter described, and particularly set forth in the appended claims, together with such variations and modifications thereof that will be apparent to one skilled in the art to which the invention pertains.

Reference should be had to the accompanying drawings forming a part of the specification, in which:

Figure 1 is a side elevation of a tractor unit embodying the invention and showing the tractor unit mounted in the forward end of a truck frame;

Fig. 2 is a horizontal section taken on the line indicated at 2—2 in Fig. 1 looking downwardly, the engine being removed in this view;

Fig. 3 is a fragmentary detail view showing the tongue operated brake in vertical section;

Fig. 4 is a front elevation of the tractor unit;

Fig. 5 is a section on an enlarged scale taken on the line indicated at 5—5 in Fig. 1;

Fig. 6 is a section taken on the line indicated at 6—6 in Fig. 4;

Fig. 7 is a sectional view on an enlarged scale taken on the line indicated at 7—7 in Fig. 6;

Fig. 8 is a section on an enlarged scale taken on the line indicated at 8—8 in Fig. 6; and Fig. 9 is a section similar to Fig. 8 showing the shifter collar and thrust pin in clutch engaging position.

Referring to the accompanying drawings, the tractor unit of the present invention is shown mounted in the forward end of a truck frame 1. The tractor unit is mounted in the truck frame 1 to turn about a vertical axis, the frame 3 of the tractor unit being rotatably mounted in an annular bearing member 2 at the forward end of the frame 1 and being provided with an annular bearing portion which fits within the bearing portion 2 of the truck frame. A traction wheel 4 has an axle 5 mounted on the annular bearing member 3, so that the wheel 4 is a steering wheel as well as a traction wheel. The mounting of the tractor unit in the truck frame is substantially the same as in the truck shown and described in my Patent No. 2,209,356, granted July 30, 1940.

A draft tongue 6 is connected by a horizontal pivot 7 to the tractor unit frame 3 and by means of this tongue the tractor unit may be turned within the bearing portion 2 of the truck frame to steer the truck, and the truck may be drawn forwardly or pushed rearwardly by means of the tongue 6, when desired. The downward movement of the tongue 6 is limited by engagement of the tongue with a bumper bar 8 at the forward end of the tractor unit frame 3 and the tongue may be detachably secured in its uppermost, substantially vertical position by means of a latch 9 pivotally mounted on the bumper bar 8 and loosely engaging a lug 10 adjacent the rearward end of the tongue 6.

The tractor unit frame has a platform 11 which provides a support for a driving motor 12, which may be an internal combustion engine. Through suitable gearing in a reduction gear housing 13, the motor 12 drives a horizontal shaft 14 above the rear end portion platform 11, the shaft 14 having a sprocket 15 attached thereto, through which the propelling mechanism is driven. Forwardly of the shaft 14, two vertically spaced shafts 16 and 17 are mounted between inner and outer uprights 18 and 19 attached to the platform 11. The outer upright 19 is in the form of a plate extending substantially the full length of the platform 11 along an edge thereof. The inner upright 18 is a narrower plate disposed between a portion of the motor 12 and the forward end of the platform 11. The shafts 16 and 17 are clamped between the uprights 18 and 19 by means of bolts 20 which extend through the uprights 18 and 19 and screw into threaded bores in the ends of the shafts.

Adjacent the outer upright 19, clutch elements in the form of friction disks 21 and 22 are rotatably mounted upon the shafts 16 and 17. The disks 21 and 22 are provided with ball thrust bearings 23, the inner rings of which bear against washers 24 clamped between the upright 19 and the outer ends of the shafts 16 and 17. On their inner sides, the disks 21 and 22 have flat friction faces 25, and to the outer sides of the disks sprockets 26 and 27 are rigidly attached to the disks 21 and 22 by means of screws 28. A sprocket chain 29 extends over the sprockets 15, 26 and 27 so that when the sprocket 15 is driven by the motor 12, the sprockets 26 and 27 are continuously rotated in the same direction. Adjacent to and inwardly of the clutch disks 21 and 22, clutch disks 31 and 32 are mounted, disks 21 and 31 providing a pair of coacting clutch elements on the upper shaft 16 and the disks 22 and 32 providing a similar pair of clutch elements on the shaft 17. The disks 31 and 32 are provided with ball thrust bearings 33, the inner races of which are slidable on the shafts 16 and 17 and engageable with thrust washers 34 on the shafts 16 and 17. The disks 31 and 32 are provided with flat facing rings 35 composed of suitable friction material which are engageable with the faces 25 of the disks 21 and 22. By pressing either of the disks 31 or 32 axially toward the opposed disks 21 or 22, either of the disks 31 or 32 may be caused to turn in unison with the motor driven disk on its shaft. Sprockets 36 and 37 are rigidly attached to the disks 31 and 32 by means of screws 38. The clutch disk 31 of the upper pair is adapted to be pressed into engagement with the disk 21 by means of a shifter collar 39 slidable on the shaft 16; and the disk 32 on the lower shaft 17 is adapted to be pressed into clutching engagement with the disk 22 by means of a shifter collar 40 slidably mounted on the shaft 17 immediately beneath the collar 39.

A sprocket 41 is attached to the traction wheel 4 and a sprocket chain 42 extends around the sprocket 36 on the upper shaft 16 and the sprocket 41. An idler sprocket 43 is mounted on a horizontal shaft 44 and is positioned intermediate the shafts 16 and 17 and forwardly thereof. The sprocket chain 42 extends over the idler sprocket 43 and rearwardly therefrom with its exterior engaging the sprocket 37 on the shaft 17 through an arc of contact sufficient for effective driving engagement. When the upper pair of clutch elements 21 and 31 are engaged, the sprockets 26 and 36 are simultaneously rotated in the same direction and the chain 42 and the traction wheel 4 are driven through the sprocket 36. When the pair of clutch elements 22 and 32 on the lower shaft 17 are engaged, the sprockets 27 and 37 are rotated in unison and the chain 42 is driven through the sprocket 37. By reason of the fact that the sprocket 36 engages the interior of the sprocket chain 42 while the sprocket 37 engages the exterior of the sprocket chain 42, the chain 42 is driven in one direction through the sprocket 36 when the sprocket 36 is clutched to the sprocket 26 and in the opposite direction through the sprocket 37 when the sprocket 37 is clutched to the sprocket 27.

In order to maintain the proper tension in the sprocket chain 42, the sprocket 43 may be mounted in any suitable way for horizontal adjustment. As herein shown, the sprocket 43 is mounted on a shaft 44 which is clamped between the uprights 18 and 19 by means of bolts 45 extending through horizontal slots 46 in the uprights 18 and 19. By properly positioning the bolts 45 in the slots 46 before clamping the shaft in place, the sprocket 43 may be adjusted to take up any slack in the sprocket chain 42. The engine is attached to the platform 11 by means of suitable anchoring bolts 47, which pass through longitudinal slots 48 in the platform. By adjusting the engine on the platform before tightening the bolts 47, the proper tension may be applied to the sprocket chain 26.

The shifter collars 39 and 40 have integral, forwardly extending arms 49 and 50 which are connected by a link 51 so that the collars 39 and 40 are constrained to turn simultaneously in the same direction. Stationary collars 52 and 53 are interposed between the shifter collars 39 and 40 and the inner supporting standard 18. The collars 52 and 53 are provided with peripheral projections 54 which engage with fixed lugs 55 on the supporting standard 18 to hold the collars 52 and 53 against turning movements on the shaft. The shifter collar 39 and adjacent stationary collar 52 on the upper shaft 16, and the shifter collar 40 and adjacent stationary collar 53 on the lower shaft 17 are provided on their opposed faces with circumferentially spaced recesses 56 and 57, which provide seats for opposite ends of thrust pins 58. The pins 58 between the two collars on each shaft are regularly spaced about the axis of the collars at an inclination to the opposed faces of the collars. The pins 58 engaging each of the shifter collars 39 and 40 are so disposed that upon turning movement of the collar in one direction the pins move toward a position parallel with the axis and exert an axial thrust on the collar. The thrust pins 58 engaging one shifter collar are inclined oppositely to the pins engaging the other shifter collar so that pressure is applied to one collar when it is turned in one direction and to the other collar when it is turned in the opposite direction. As illustrated in the drawings, the pins 58 interposed between the collars 39 and 52 move from the position shown in Fig. 8 to the position shown in Fig. 9 when when the arms 49 and 50 are moved downwardly, exerting an axial pressure against the collar 39 and pressing the clutch element 31 into engagement with the clutch element 21. When the arms 49 and 50 are moved upwardly from the neutral position shown in full lines in Fig. 6, the thrust pins 58 interposed between the collars 40 and 53, which are oppositely disposed with respect to the pins between the collars on the upper shaft, apply axial pressure to the collar 40, engaging the clutch elements 22 and 32. Thus, by moving the arms 49 and 50 upwardly or downwardly, the truck may be propelled in a forward or a rearward direction.

Only a very slight clearance is necessary between the clutch disks and the actuating collars need have very little axial movement since axial pressure is necessary to maintain driving engagement between the friction clutch elements. Since the clutch actuating collars are actuated by turning movements in a vertical direction, the entire reversible driving mechanism may be mounted in the narrow space between the uprights 18 and 19. In order to properly position the clutch elements and to compensate for wear between the friction faces of the clutch elements, shims 59 may be inserted between the thrust collars 52 and 53 and the supporting standard 18.

At its forward end, the draft tongue 6 is provided with a transverse handgrip portion 60, upon which is rotatably mounted a sleeve 61. The sleeve 61 has a projecting lug 62, to which one end of a rod 63 is pivotally attached. The opposite end of the rod 63 is pivotally connected to the outer end of the lower forwardly projecting arm 50. The operator by gripping the sleeve 61 and turning the same in a counterclockwise direction, as viewed in Fig. 1, lifts the arms 49 and 50, clutching the sprocket 37 to the sprocket 27 to propel the truck forwardly. Upon turning movement of the sleeve 61 in a clockwise direction, the arms 49 and 50 are moved downwardly to clutch the sprocket 36 to the sprocket 26 to propel the truck rearwardly.

Whenever the truck tends to overtake the operator walking ahead of the truck holding the handgrip of the tongue, the tongue 6 will be moved towards vertical position and means is provided for controlling the operation of the driving mechanism by the tongue to automatically move the clutch actuators to neutral position to prevent injury to an operator, the operating connections being so arranged that when the tongue approaches its uppermost position, as shown in dotted lines in Fig. 1, the shifter collars are held against movement in a direction to engage the clutch through which the truck is propelled forwardly. Suitable means is provided for limiting the turning movements of the sleeve 61 with respect to the handgrip 60, so that in the uppermost position of the tongue the sleeve 61 is normally in its neutral position and is movable in one direction only from its neutral position. As shown in Fig. 1 of the drawings, the rod 63 bears against the sleeve 61 when the rod is in vertical position and prevents turning of the sleeve in a counterclockwise direction. To provide for disengagement of the clutch through which the truck is propelled forwardly at the desired point in the movement of the draft tongue, the handgrip portion 60 of the tongue may be provided with a radial pin 64, which extends through an arcuate slot 65 in the sleeve 61. The pivotal connection between the arm 50 and the actuating rod 63 is spaced from the pivot 7 of the tongue so that vertical swinging movements of the tongue 6 cause the handgrip portion 60 to turn within the sleeve 61. The pin 64 and the slot 65 are so arranged that when the tongue approaches its uppermost position the pin 64 engages with an end of the slot 65, so that further turning movement of the handgrip 60 within the sleeve is prevented. The range of movement of the actuating members on the tongue is thus positively restricted to a movement from neutral position to a position engaging the clutch through which the truck is propelled rearwardly and the lifting of the arms 49 and 50 to clutch the sprockets 27 and 37 is prevented, so that with the tongue in this position the truck cannot be propelled forwardly. The sleeve 61, however, is free to turn in a clockwise direction when the tongue is in its uppermost position, so that the operator may cause the truck to be propelled rearwardly when the handle is in this position.

To enable the operator to bring the truck quickly to a stop, a brake is provided which is controlled by the draft tongue 6. The brake device comprises a bar 66 which is slidably mounted on the frame 3 and guided by the pivot 7, and a pin 67 on the frame 3 adjacent the periphery of the wheel, the bar 66 carrying a brake shoe 68 which is brought into engagement with the periphery of the wheel upon a pivotal movement of the tongue 6. The bar 66 carries an adjustable abutment in the form of a screw 69, which is adapted to be secured in adjusted position by means of a nut 70. The head of the screw 69 is in the path of movement of a lug 71 on the tongue 6 and is engaged by the lug 71 as the tongue 6 approaches its vertical position. By pressing the upper end of the tongue 6 toward the truck, pressure is applied through the bar 66 to the brake shoe 68 bearing against the periphery of the wheel 4. Sufficient play is provided between the latch 9 and lug 10 with the latch in locking position to permit the application of the brake. Upon release of the pressure exerted by the draft tongue the brake is brushed away from the wheel tread when the wheel rotates.

A fuel tank 72 may be mounted upon the upper end of the outer standard 19 and suitable bracket 73 attached to the standard.

The operator by gripping the sleeve 61 and exerting a forward pull on the draft tongue can, with little effort, turn the sleeve in a direction to exert a pull upon the rod 63, lift the arms 49 and 50, and engage the lower clutch to propel the truck forwardly. Likewise, by gripping the sleeve 61 and exerting a rearward push, the rod 63 is actuated with little effort to move the arms 49 and 50 downwardly and engage the upper clutch to propel the truck rearwardly. By maintaining his grip on the sleeve 61 after initial actuation, the necessary pressure may be maintained upon the engaged clutch element. At any time the traction wheel may be released from the driving mechanism by merely releasing the sleeve 61 and the truck may be quickly stopped by swinging the draft tongue to brake applying position.

The present invention provides a simple and compact self-propelled tractor unit having a clutch controlled reversing mechanism controlled by actuators which are directly connected to operating members on the draft tongue in such a way as to provide a convenient and safe control of the driving mechanism by an operator walking in the direction of travel of the truck and guiding its movement by means of the draft tongue.

It is to be understood that variations and modifications of the specific devices herein shown and described for purposes of illustration, may be made without departing from the spirit of the invention.

What I claim is:

1. A tractor unit comprising a frame, a traction wheel journaled in the frame, a draft tongue pivoted at its rearward end to the frame to swing about a horizontal axis, a motor carried by the frame, means for driving the traction wheel from said motor including a clutch controlled reversing mechanism, means for operating said clutches including an operating member mounted for movement in either direction from a neutral position to cause said unit to be propelled forwardly or rearwardly, an actuating member movably mounted on said tongue, a rod connected to said actuating member and pivoted to said clutch operating member laterally of the pivotal axis of the tongue whereby said actuating member is moved relatively to the tongue upon a swinging movement of said tongue, and means for limiting the movement of the actuating member in one direction with respect to the tongue to restrict the movement of said clutch operating member to a movement in one direction from neutral position when said tongue is in its uppermost position.

2. A tractor unit comprising a frame, a traction wheel journaled in the frame, a draft tongue pivoted at its rearward end to the frame to swing about a horizontal axis, a motor carried by the frame, means for driving the traction wheel from said motor including a clutch controlled reversing mechanism, means for operating said clutches including an operating member mounted for movement in either direction from a neutral position to cause said unit to be propelled forwardly or rearwardly, an actuating member mounted upon said tongue and operably connected to said clutch operating member to actuate the same in either direction, and means controlled by swinging movements of said tongue for preventing actuation of said clutch operating member in a direction to propel said unit forwardly when said tongue is in its uppermost position.

3. A tractor unit comprising a frame, a traction wheel journaled in the frame, a draft tongue connected at its rearward end to said frame to swing about a horizontal axis, said tongue having a transverse handgrip portion adjacent its forward end, a motor carried by the frame, means for driving the traction wheel from said motor including a clutch controlled reversing mechanism, means for operating said clutches including a clutch operating member mounted for movement in either direction from a neutral position to cause the unit to be propelled forwardly or rearwardly, a sleeve rotatably mounted on said handgrip portion, an actuating rod connected eccentrically to said sleeve and pivoted to said clutch operating member laterally of the pivotal axis of the tongue whereby said handgrip portion turns within said sleeve as said tongue is swung vertically, and means for limiting the turning movement of the sleeve with respect to said hand grip to restrict the movement of said clutch operating member to a movement in one direction from neutral position when said draft tongue is in its uppermost position.

4. A tractor unit comprising a supporting frame, a traction wheel, a draft tongue connected at its rearward end to said frame to swing about a horizontal axis, said tongue having a transverse handgrip portion adjacent its forward end, a motor mounted on the frame, means including a clutch controlled reversing mechanism for driving said traction wheel from said motor, means for operating said clutches including a vertically movable clutch operating member movable upwardly or downwardly from a neutral position to propel the unit forwardly or rearwardly, a sleeve rotatably mounted on said handgrip portion, an actuating rod connected eccentrically to said sleeve and pivoted to said clutch operating member, the pivot connecting said rod and clutch operating member being spaced from the pivotal axis of the tongue, whereby said handgrip portion turns within the sleeve as the draft tongue is swung vertically, and means for limiting the turning movement of the sleeve with respect to the handgrip portion to restrict the range of movement of said control member when said draft tongue is in its uppermost position to a movement downwardly from neutral position.

5. A tractor unit comprising a frame, a motor carried by the frame, a traction wheel journaled in the frame, a draft tongue pivoted to the frame, two spaced parallel shafts mounted in the frame, a pair of clutch elements mounted on each shaft, a driving connection between said motor and one clutch element of each pair for continuously rotating the latter clutch elements, a driving connection between each of the other two clutch elements and said wheel, one of said driving connections being a reverse driving connection, clutch operating means including an actuating member movable in one direction from a neutral position to engage the clutch elements of one pair and in the opposite direction from said neutral position to engage the clutch elements of the other pair, whereby said wheel may be driven in a forward or reverse direction, and means carried by said draft tongue for operating said actuating member.

6. A tractor unit comprising a frame, a motor carried by the frame, a traction wheel journaled in the frame, a draft tongue pivoted to the frame, two spaced horizontal shafts mounted in the frame, a pair of clutch elements having opposed friction faces mounted side by side on each shaft, one clutch element of each pair being slidable upon the shaft to engage or disengage said friction faces, a driving connection between the motor and one clutch element of each pair for continuously rotating the latter clutch elements, a driving connection between each of the other two clutch elements and said wheel, one of said driving connections being a reverse driving connection, means for pressing together the friction faces of the clutch elements of either pair including an actuating member movable in one direction from a neutral position to engage the clutch elements of one pair in the other direction from said neutral position to engage the clutch elements of the other pair, whereby said wheel may be driven in a forward or reverse direction, and means carried by said tongue for operating said actuating member.

7. A tractor unit comprising a frame, a motor carried by the frame, a traction wheel journaled in the frame, a draft tongue pivoted to the frame, two spaced horizontal shafts mounted in the frame, a pair of clutch elements having opposed friction faces mounted side by side on each shaft, one clutch element of each pair being slidable upon the shaft to engage or disengage said friction faces, a driving connection between the motor and one clutch element of each pair for continuously rotating the latter clutch elements, a driving connection between each of the other two clutch elements and said wheel, one of said driving connections being a reverse driving connection, a collar slidably and rotatably mounted on each of said shafts adjacent each of the slidable clutch elements, an arm attached to each collar, a link connecting said arms to cause the collars to turn simultaneously in the same direction, means interposed between one collar and the frame for pressing said collar toward clutch engaging position upon a turning movement in one direction from a neutral position, means interposed between the other collar and the frame for pressing the latter collar toward clutch engaging position upon a turning movement in the opposite direction from said neutral position, an actuating member carried by said tongue and connected to one of said arms.

8. A tractor unit comprising a frame, a motor carried by the frame, a traction wheel journaled in the frame, a draft tongue pivoted to the frame, two spaced horizontal shafts mounted in the frame, a pair of clutch elements having opposed friction faces mounted side by side on each shaft, one clutch element of each pair being slidable upon the shaft to engage or disengage said friction faces, a driving connection between the motor and one clutch element of each pair for continuously rotating the latter clutch elements, a driving connection between each of the other two clutch elements and said wheel, one of said driving connections being a reverse driving connection, a collar slidably and rotatably mounted on each of said shafts adjacent each of the slidable clutch elements, an arm attached to each collar, a link connecting said arms to cause the collars to turn simultaneously in the same direction, means interposed between one collar and the frame for pressing said collar toward clutch engaging position upon a turning movement in one direction from a neutral position, means interposed between the other collar and the frame for pressing the latter collar toward clutch engaging position upon a turning movement in the opposite direction from said neutral position, a handgrip bar at the outer end of said tongue, a sleeve rotatably mounted on said bar, and an actuating rod connected at one end to said sleeve and at its opposite end to one of said arms.

9. A tractor unit comprising a frame, a motor carried by the frame, a traction wheel journaled in the frame, a draft tongue pivoted to the frame, two spaced horizontal shafts mounted in the frame, a pair of clutch elements having opposed friction faces mounted side by side on each shaft, one clutch element of each pair being slidable upon the shaft to engage or disengage said friction faces, a driving connection between the motor and one clutch element of each pair for continuously rotating the latter clutch elements, a driving connection between each of the other two clutch elements and said wheel, one of said driving connections being a reverse driving connection, a collar slidably and rotatably mounted on each of said shafts adjacent each of the slidable clutch elements, an arm attached to each collar, a link connecting said arms to cause the collars to turn simultaneously in the same direction, thrust pins interposed between said collars and the frame, said thrust pins being angularly movable upon turning movements of the collars and arranged to exert an axial thrust on one collar toward clutch engaging position upon a turning movement of the collars in one direction from a neutral position and to exert an axial thrust upon the other collar toward clutching position when the collars are turned in an opposite direction from said neutral position, an actuating member carried by said tongue and connected to one of said arms.

10. A tractor unit comprising a frame, a traction wheel journaled in the frame, a draft tongue pivoted at its rearward end to the frame to swing about a horizontal axis, a motor carried by the frame, means for driving the traction wheel from said motor including a clutch controlled reversing mechanism, two spaced parallel shafts mounted on said frame, means for driving said traction wheel to propel the unit forwardly including a pair of relatively movable friction clutch elements on one of said shafts, means for driving said traction wheel to propel the unit rearwardly including a pair of relatively movable friction clutch elements on the other shaft, a sleeve rotatably mounted on said handgrip portion, and means operated by said sleeve for engaging the clutch elements on one shaft upon a turning movement of the sleeve in one direction and for engaging the clutch elements on the other shaft upon a turning movement of the sleeve in the opposite direction.

11. A tractor unit comprising a frame, a traction wheel journaled in the frame, a draft tongue pivoted at its rearward end to the frame to swing about a horizontal axis, a motor carried by the frame, means for driving the traction wheel from said motor including a clutch controlled reversing mechanism, two spaced parallel shafts mounted on said frame, means for driving said traction wheel to propel the unit forwardly including a pair of relatively movable friction clutch elements on one of said shafts, means for driving said traction wheel to propel the unit rearwardly including a pair of relatively movable friction clutch elements on the other shaft, a sleeve rotatably mounted on said handgrip portion, and means controlled by pivotal movements of the tongue for holding one of said clutch elements out of engaging position.

12. A tractor unit for trucks comprising a frame, a motor carried by said frame, a traction wheel journaled in said frame, two spaced shafts mounted in the frame above and parallel with the axis of said wheel, a clutch element rotatably mounted on each of said shafts, means interposed between the motor and said clutch elements for driving both clutch elements in the same direction, a second clutch element rotatably mounted on each shaft alongside the motor driven clutch element, the two clutch elements on each shaft being relatively movable on the shaft into and out of clutching engagement, means for shifting said movable clutch elements including a movable operating member and means connecting said member to a clutch element of each pair operable to engage one pair of clutch elements upon movement of said member in one direction from a neutral position and to engage the other pair of clutch elements upon movement of said member in the opposite direction from said neutral position, a wheel driving sprocket, a sprocket attached to each of said second clutch elements, and a sprocket chain extending around said wheel driving sprocket and one of said clutch attached sprockets and having its exterior in driving engagement with the other of said clutch attached sprockets, whereby said traction wheel may be driven in one direction by one of said clutch attached sprockets or in the opposite direction by the other.

13. A tractor unit for trucks comprising a frame, a motor carried by said frame, a traction wheel journaled in said frame, two spaced shafts mounted in the frame above and parallel with the axis of said wheel, a friction clutch disk rotatably mounted on each of said shafts, means interposed between the motor and said clutch disks for driving both clutch disks in the same direction, a second clutch disk rotatably mounted on each shaft alongside the motor driven clutch disk, the two clutch disks on each shaft being relatively movable on the shaft into and out of clutching engagement, means for shifting said movable clutch disks including a movable operating member and means connecting said member to a clutch disk of each pair operable to engage one pair of clutch disks upon movement of said member in one direction from a neutral position and to engage the other pair of clutch disks upon movement of said member in the opposite direction from said neutral position, a wheel driving sprocket, a sprocket attached to each of said second clutch disks, and a sprocket chain extending around said wheel driving sprocket and one of said disk attached sprockets and having its exterior in driving engagement with the other of said disk attached sprockets, whereby said traction wheel may be driven in one direction by one of said disk attached sprockets or in the opposite direction by the other.

14. A tractor unit for trucks comprising a frame, a motor carried by the frame, a traction wheel journaled in the frame, a wheel driving sprocket, a motor driven sprocket, two spaced shafts mounted in the frame, a pair of sprockets rotatably mounted side by side on each of said shafts, the sprockets of each pair having opposed clutch elements attached thereto, one sprocket of each pair being slidable upon the shaft toward and away from the other sprocket of the pair to engage or disengage the clutch elements, a sprocket chain engaging one sprocket of each of said pairs and the motor driven sprocket, a second sprocket chain engaging the wheel driving sprocket and the other sprockets of said pairs, one of said chains extending around both the sprockets on said spaced shafts with which it engages, the other chain extending around the sprocket on one of said shafts with which it engages and having its exterior in driving engagement with the sprocket with which it engages on the other of said shafts, and means for shifting the movable sprocket of either of said pairs to clutch the sprockets of the pair together.

15. A tractor unit comprising a frame, a traction wheel journaled in the frame, a motor carried by the frame, two spaced parallel shafts mounted on said frame, means for driving said traction wheel to propel the unit forwardly including a pair of relatively movable friction clutch elements on one of said shafts, means for driving said traction wheel to propel the unit rearwardly including a pair of relatively movable friction clutch elements on the other shaft, a collar mounted to slide and turn on each of said shafts adjacent the movable clutch elements on each shaft, means associated with one collar for sliding the collar on the shaft to engage the adjacent pair of clutch elements upon turning movement in one direction, means associated with the second collar for sliding the same on the shaft to engage the other pair of clutch elements upon a turning movement in the opposite direction, and means for simultaneously turning the two collars in either direction to clutch one or the other pair of clutch elements.

IRVIN F. SCHRECK.